T. S. BIRD & W. BOGGS.
DUMPING SCOW.
No. 186,530. Patented Jan. 23, 1877.
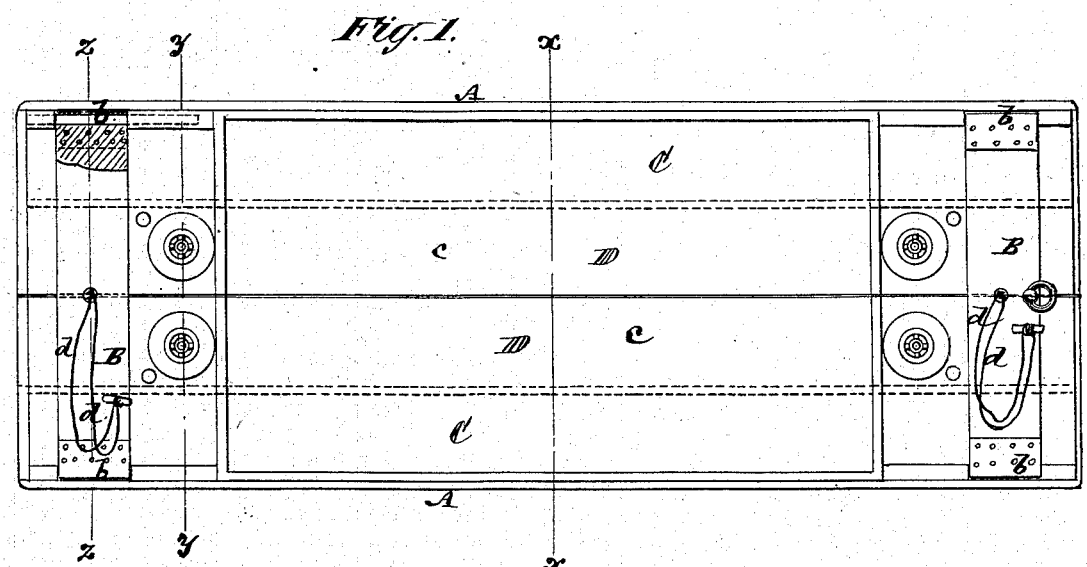
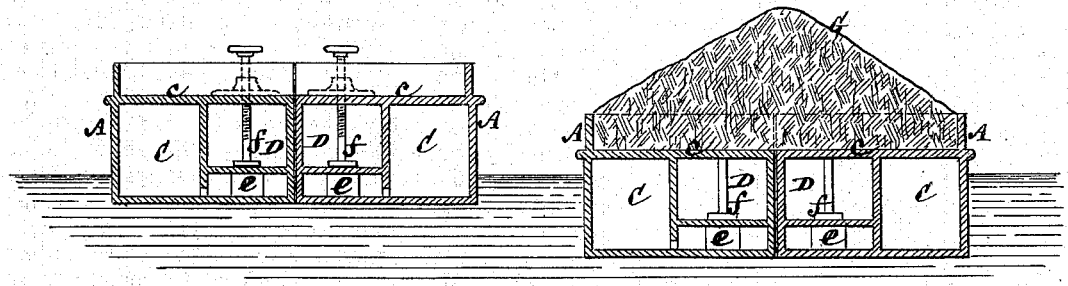
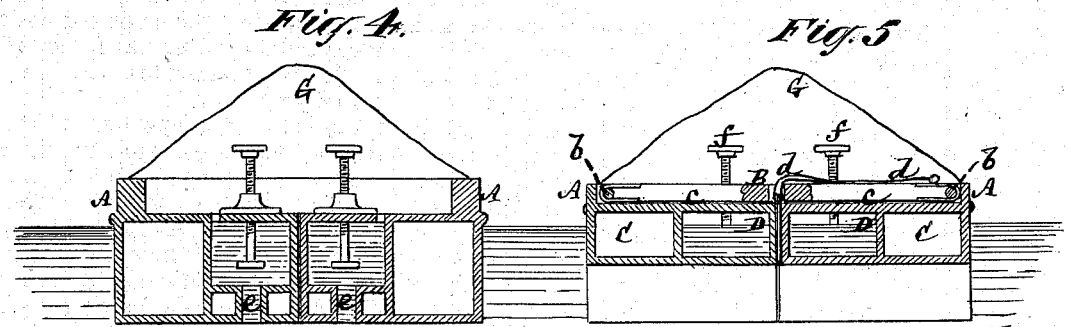
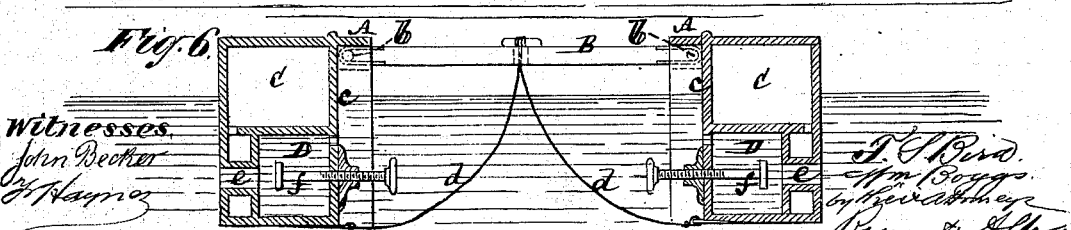

UNITED STATES PATENT OFFICE.

THEODORE S. BIRD AND WILLIAM BOGGS, OF GREEN POINT, BROOKLYN, NEW YORK.

IMPROVEMENT IN DUMPING-SCOWS.

Specification forming part of Letters Patent No. 186,530, dated January 23, 1877; application filed July 20, 1876.

*To all whom it may concern:*

Be it known that we, THEODORE S. BIRD and WILLIAM BOGGS, both of Green Point, in the city of Brooklyn, county of Kings, and State of New York, have invented certain new and useful Improvements in Dumping-Scows; and we do hereby declare that the following is a full, clear, and exact description of the same, reference being had to the accompanying drawing, which forms part of this specification.

This invention consists in a dumping-scow composed of independent floats hinged together, and organized so that the same may either be closed and adjusted to present a single loading-surface, or be opened and separated by turning them over on their sides from their hinged connection as a center of motion to dump the load from off them. The invention also consists in a dumping-scow composed of duplicate or independent floats hinged together at their outer sides by means of transverse bridges, braces, or connections, and organized so that said floats may be turned over on their sides to dump the load from off and between them. The invention likewise consists in a dumping-scow having combined with it one or more laterally-arranged water chambers or compartments, and organized to turn over on its side for the purpose of dumping the load by admitting water from the exterior of the floating scow to said chambers or compartments, and thereby forming a tilting-weight. Such water may be admitted by one or more valves, which should be kept closed, so as to exclude the water from entering the lateral compartment or compartments of the loaded scow till it is required to turn over the latter on its side, for the purpose of dumping the load. This feature of a water-weighting compartment or compartments may be applied not only to a scow composed of a single float, and organized to turn over bodily on its side when dumping the load, but also to dumping-scows composed of duplicate floats hinged together on their outer sides, although, when the floats are thus laterally pivoted or hinged, the water-weighting compartments may be dispensed with, especially when the load consists of loose material, and the same is piled up highest in the center—that is, over the meeting joint or sides of the duplicate floats, inasmuch as the load itself may then form sufficient weight to tilt or turn over the floats on their sides when liberated to dump. Such water-weighting compartments may, however, be used to advantage even in a scow composed of duplicate floats hinged together at their outer sides, and meeting when closed at their inner sides, which is the modification here selected to illustrate the invention.

Figure 1 is a plan of a dumping-scow, showing the invention in accordance with this last-named modification, and having water-weighting compartments in its floats to facilitate the tilting of the latter when dumping. Fig. 2 is a transverse section of the same, on the line $x$ $x$, prior to the loading of the scow. Fig. 3 is a similar transverse section, on the same line $x$ $x$, after the scow has been loaded. Fig. 4 is a transverse section on the line $y$ $y$, and Fig. 5 a transverse section on the line $z$ $z$, after the water has been admitted to certain compartments in its floats to facilitate the tilting of the latter when dumping. Fig. 6 is a transverse section, showing the changed position of the floats after the latter have been tilted or turned over on their sides and the load dumped therefrom.

A A are duplicate or independent floats, arranged side by side, and hinged together on their outer sides by hinges or joints $b$ $b$, at the opposite ends of transverse bridges, braces, or connections B, which extend over the deck portions $c$ $c$ of the floats when the latter are closed to meet along their inner sides, as shown in Figs. 1, 2, 3, 4, and 5 of the drawing. When the floats are thus closed, the divided scow presents a single loading or deck surface, $c$ $c$, and said floats may be closed and secured or locked in their closed positions by means of ropes or chains $d$ $d$, which are attached at their one end to the floats, and are fastened at their other end round or on bits carried by the bridges, or to windlasses mounted on the latter, and whereby facility is afforded for liberating the floats, so that they may be tilted to dump the load. Other means may be used, however, for operating and securing the floats. Each of said floats A is constructed with one or more air chambers or compartments, C, arranged along the outer or hinged sides of said floats, to contribute to the buoyancy of the latter, and is furthermore constructed with one or more water-weighting compartments, D, arranged along the inner sides of said floats—that is, the sides farthest removed from their respective hinges $b$. These water-weighting compartments are in communication by apertures $e$, which may be variously arranged, with the water outside of the scow, subject to the control of screw or other valves $f$, which may be arranged either to move up and down laterally, or in any other direction. These valves are closed before loading the scow, and remain closed after the scow has been loaded, and till the latter has been towed or removed to wherever it may be desired to dump the load, so as to exclude the water from entering the compartments D, as shown in Figs. 2 and 3. The valves $f$ are then opened, as shown in Fig. 4, and water admitted from the outside of the scow to the compartments D, and the cords or chains $d\ d$ released to allow of the floats tilting or turning over on their sides from the hinges $b\ b$, as centers of motion, by the combined weight of the load G and that of the water weighted or loaded compartments D, or either, as shown in Fig. 6. This causes the load to be dumped from the divided deck $c\ c$, by reason of the change in the position of the latter and space afforded for the running off of the load between the hinged floats of the scow. After this the ropes or chains $d\ d$ are then drawn taut again, and secured to close and hold or lock in their closed positions the floats A A, and before loading again the valves $f$ are closed to repeat the operation, as before.

We claim—

1. A divided dumping-scow, composed of independent floats hinged together, and organized to admit of the same being turned over on their sides, for the purpose of dumping the load, but presenting a single or continuous deck or loading surface when said floats are adjusted to close the scow, substantially as specified.

2. A divided dumping-scow, composed of duplicate or independent floats hinged together at their outer sides by means of transverse bridges, braces, or connections, and organized to admit of said floats being turned over on their sides to dump the load from off and between them, essentially as described.

3. A dumping-scow having combined with it one or more laterally-arranged water-weighting chambers or compartments, and a valve or valves controlling the latter, the whole being organized to provide for the dumping of the load by the partial turning over of the scow or floats composing the same on water being admitted to said chambers or compartments, essentially as described.

THEODORE S. BIRD.
WILLIAM BOGGS.

Witnesses:
A. J. DE LACY,
BENJAMIN W. HOFFMAN.